US008334476B2

United States Patent
McCracken et al.

(10) Patent No.: US 8,334,476 B2
(45) Date of Patent: Dec. 18, 2012

(54) ABRASION AND IMPACT RESISTANT COATINGS

(75) Inventors: Jerry McCracken, Calmar (CA); Dale M. Homeniuk, Spruce Grove (CA)

(73) Assignee: McCoy Corporation, Edmonton, Alberta (CA)

( * ) Notice: Subject to any disclaimer, the term of this patent is extended or adjusted under 35 U.S.C. 154(b) by 1251 days.

(21) Appl. No.: 12/153,327

(22) Filed: May 16, 2008

(65) Prior Publication Data

US 2008/0286598 A1    Nov. 20, 2008

Related U.S. Application Data

(60) Provisional application No. 60/924,500, filed on May 17, 2007.

(51) Int. Cl.
    *B23K 10/00*    (2006.01)
(52) U.S. Cl. ........... 219/121.59; 219/121.47; 219/76.16; 427/450
(58) Field of Classification Search ............. 219/121.47, 219/121.59, 121.52, 76.15, 76.16; 427/217, 427/34; 228/119, 246
See application file for complete search history.

(56) References Cited

U.S. PATENT DOCUMENTS

| 4,013,453 | A | * | 3/1977 | Patel | 75/252 |
| 4,173,685 | A | * | 11/1979 | Weatherly | 428/556 |
| 5,021,629 | A | * | 6/1991 | Shimomura | 219/121.59 |
| 5,366,136 | A | * | 11/1994 | Pagnon | 228/119 |
| 6,447,848 | B1 | * | 9/2002 | Chow et al. | 427/446 |

\* cited by examiner

*Primary Examiner* — Mark Paschall
(74) *Attorney, Agent, or Firm* — Arne I. Fors

(57) ABSTRACT

A method of hard facing a metal substrate with a two-layer abrasion and impact resistant coating by fusing a softer inner first coat of a matrix alloy of nickel-, cobalt- or iron-base alloy with carbide particles onto the substrate and fusing a harder second outer coat of a matrix alloy of nickel-, cobalt- or iron-base alloy with angular carbide particles onto the softer inner first coat. The softer inner first coat preferably has a hardness of about 30-40 Rc and the harder outer second coat preferably has a hardness of about 50-60 Rc. The carbide particles preferably are tungsten carbide particles in the size range of about 60 to 250μ and comprise about 55 to 65 wt % of each of the inner and outer coats.

8 Claims, No Drawings

ABRASION AND IMPACT RESISTANT COATINGS

BACKGROUND OF THE INVENTION (i) Field of the Invention

This invention relates to an abrasion, wear and impact resistant hard facing coating and, more particularly, relates to an abrasion, wear and impact resistant coating, and its method of production, on equipment components used in high wear applications typified by the mining of oil sands.

Mining of oil sands involves excavation and transfer of huge volumes of stratified sand saturated with bitumen for recovery of hydrocarbons. The sand essentially is a quartz sand angular in shape and as a result very abrasive to steel equipment. The hard facing of steel equipment to resist wear and erosion by coating exposed steel surfaces with tungsten carbide particles dispersed in a matrix of mild steel or a nickel- or cobalt-base alloy is known. U.S. Pat. No. 4,013,453 for example discloses hard surfacing of a metal substrate by coating with a nickel-base matrix powder mixed with coarse tungsten carbide particles to resist wear and abrasion. It is stated that such coatings are sensitive to thermal cracking and spalling due to the brittle nature of the coating.

The hard facing of equipment used for the mining and handling of oil sands is particularly sensitive to wear, to erosion due to abrasion, and to spalling due to the shock of impact from dropping of large lumps of oil sand on shaker boxers or rotary breaker drums for screening the sands.

SUMMARY OF THE INVENTION

It is a principal object of the present invention therefore to provide an improved wear, abrasion and impact resistant hard facing to steel equipment used in the mining and handling of abrasive materials typified by oil sands.

In its broad aspect, the method of hard facing a metal substrate with an abrasion and impact resistant coating comprises fusing a mixture of a nickel-, cobalt- or iron-base alloy and non-angular carbide particles such as tungsten carbide particles such as by plasma transferred arc welding onto the substrate for metallurgically bonding of a first coat having a first hardness onto the substrate, and fusing a second mixture of a nickel-, cobalt- or iron-based alloy and angular cast and crushed carbide powder particles such as tungsten carbide particles such as by plasma transferred arc welding onto the first coat for metallugically bonding of a second coat having a matrix hardness greater than the matrix hardness of the first coat onto the first coat. The tungsten carbide of the first coat and the second coat have a size in the range of about 60 to 250μ and comprises about 55 to 65 wt % of each of the first and second coats. The first inner coat preferably has a matrix hardness of about 30 to 40 Rc and the second coat preferably has a matrix hardness of about 50 to 60 Rc.

The coated metal substrate of the invention has an abrasion and impact resistant hard facing metallurgically bonded thereto comprising a first inner coat of a nickel-, cobalt- or iron-based matrix alloy having a first hardness and uniformly dispersed therein about 40 to 60 wt % of discrete particles of non-angular tungsten carbide, and a second outer coat metallurgically bonded to the first coat of a nickel-, cobalt- or iron-based matrix alloy having a second hardness greater than the hardness of the first matrix alloy and uniformly dispersed therein about 40 to 60 wt % of discrete particles of angular cast and crushed tungsten carbide particles.

DESCRIPTION OF THE PREFERRED EMBODIMENTS

We have found that the hard facing of steel equipment used in the excavation and transfer of oil sands by providing dual layers of a particulate carbide such as tungsten carbide dispersed in a metal alloy matrix on a metal substrate, wherein the matrix metal of an inner first layer metallurgically bonded to the substrate is softer than the matrix metal of an outer second layer metallurgicaly bonded to the inner layer, substantially enhances the wear, abrasion and impact resistance of the hard facing.

The metal matrix alloy may be nickel-, cobalt- or iron-based and may comprise, for example, a nickel-base matrix alloy for the first and second layers, or a nickel-base matrix alloy for the first layer and an iron-base matrix alloy metallurgically-bonded onto the first nickel-base matrix alloy. Dual layers of nickel-base alloys have been found suitable for rolling, high impact rotary breaker screens whereas a second layer of a less expensive iron-base matrix alloy containing dispersed angular tungsten carbide particles metallurgically-bonded onto a nickel-base matrix alloy has been found suitable for sliding, low impact screen applications encountered in high volume applications having smaller impact forces.

The particulate carbide, preferably tungsten carbide, comprises about 55 to 65 wt % of the coatings, the carbides of the first inner layer preferably being rounded, i.e. non-angular, and the carbides of the second outer layer being angular such as produced from crushed and sintered friable tungsten carbide.

The inner layer must be softer than the outer layer and we have found that an inner layer having a matrix hardness of about 30-40 Rc and an outer layer having a matrix hardness of about 50-60 Rc surprisingly provide significantly improved hard facing to steel wear surfaces.

The matrix alloy layers containing dispersed carbides of the inner and outer layers preferably are deposited in a thickness in the range of 2.5-3.5 mm. The orientation of the second layer should be deposited in a different orientation than the orientation of the first layer, preferably perpendicular to the orientation of the first layer or in the range of 45 to 90° to the orientation of the first layer.

The hard facing of a metal substrate, typically a steel substrate, is applied in two passes, preferably by plasma transferred arc welding. Each pass should be applied so that the second pass overlaps and is fused to the first pass, and not in the same orientation, preferably at an angle of from about 45 to about 90° to each other. The first pass involves welding a mixture comprised, for example, of about 37 to 43 wt % nickel-based matrix alloy containing about 3.8 wt % C, 1.2 wt % B, 4.0 wt % Si, 6.7 wt % Cr, 2.1 wt % Fe and 82.2 wt % Ni and about 63 to 57 wt % dense and non-angular tungsten carbide particles by plasma transferred arc welding at a temperature in the range of about 250-350° C., preferably about 290° C., onto a steel substrate at a thickness in the range of 2.5 to 3.5 mm.

A first inner coat produced by the method of the invention at a temperature of 290° C. with nickel-based particles and tungsten carbide particles having a mesh size of 63 to 180μ had the following representative percent compositions, with indicated hardness.

| PTA Alloy #1 Matrix Hardness Rc 33-34 | | | | | | |
|---|---|---|---|---|---|---|
| Carbon | Boron | Silicon | Chrome | Iron | Nickel | Tungsten |
| 3.75-3.90 | 0.5-0.59 | 1.55-1.67 | 2.8-2.9 | 0.9-0.99 | 33.2-34.9 | Balance |

| PTA Alloy #2 Matrix Hardness Rc 31-32 | | | | | | |
|---|---|---|---|---|---|---|
| Carbon | Boron | Silicon | Chrome | Iron | Nickel | Tungsten |
| 3.84-3.96 | 0.48-0.52 | 1.60-1.64 | 2.65-2.82 | 0.85-0.94 | 34.1-35.1 | Balance |

| PTC Alloy #3 Matrix Hardness Rc 35-36 | | | | | | |
|---|---|---|---|---|---|---|
| Carbon | Boron | Silicon | Chrome | Iron | Nickel | Tungsten |
| 3.82-3.93 | 0.52-0.56 | 1.59-1.67 | 2.75-2.89 | 0.92-1.01 | 33.9-34.8 | Balance |

The second pass onto the coat of the first pass involves welding a mixture comprised, for example, of about 37 to 43 wt % nickel-based alloy particles containing 2.3 wt % C, 3 wt % B, 3 wt % Si, 0.5 wt % Fe and 91.2 wt % Ni and about 63 wt % to 57 wt % dense and angular friable sintered tungsten carbide particles in a cast and crushed condition by plasma transferred arc welding at a temperature in the range of about 300 to 375° C., preferably about 315° C. at a thickness in the range of 2.5 to 3.5 mm.

A second outer coat produced by the method of the invention at a temperature of 315° C. with nickel-based particles and tungsten carbide particles having a mesh size of 63 to 150μ had the following representative compositions with indicated hardness.

| PTA Alloy #4 Matrix Hardness Rc 52-54 | | | | | |
|---|---|---|---|---|---|
| Carbon | Boron | Silicon | Iron | Nickel | Tungsten |
| 2.30-2.40 | 1.22-1.29 | 1.18-1.29 | 0.17-0.24 | 37.05-37.44 | Balance |

| PTA Alloy #5 Matrix Hardness Rc 55-58 | | | | | |
|---|---|---|---|---|---|
| Carbon | Boron | Silicon | Iron | Nickel | Tungsten |
| 2.37-2.42 | 1.18-1.25 | 1.21-1.29 | 0.20-0.28 | 37.38-37.52 | Balance |

| PTA Alloy #6 Matrix Hardness Rc 54-56 | | | | | |
|---|---|---|---|---|---|
| Carbon | Boron | Silicon | Iron | Nickel | Tungsten |
| 2.34-2.44 | 1.15-1.23 | 1.20-1.30 | 0.22-0.29 | 37.44-37.62 | Balance |

A first pass of nickel-based matrix alloy comprised of about 37 to 48 wt % nickel-based matrix alloy described above had a second pass of iron-based matrix alloy having about 60 wt % crushed and sintered tungsten carbide particles deposited onto the first inner coat of nickel-based alloy at a temperature of about 315° C. The second outer coat had the following general percent composition.

| Alloy #4 Matrix Hardness Rc 56 to 59 | | | | |
|---|---|---|---|---|
| Carbon | Boron | Silicon | Iron | Nickel |
| 0% | 3% | 3% | 48% | Balance |

This combination of softer inner layer of nickel-based matrix alloy containing carbides having a hardness in the range of Rc 31-36 and outer layer of harder iron-based matrix alloy containing carbides having a hardness in the range of Rc 56-59 was effective in extending the life of hard faced screens in Shaker box applications for a three-fold reduction of down time compared to conventional screens.

This invention has proven to extend the wear life of components used in the high wear applications such as the process of recovering oil from oil sands. The coating has proven to more than double the life of components such as screens when compared to the commonly used single layer of tungsten carbide. Whereas hard facing on screens having a conventional single layer of tungsten carbide hard facing will spall and wear non-uniformly, the dual layer according to the present invention wears uniformly and the rate of wear can be closely predicted to permit pro-active preventative maintenance scheduling. The essential feature of this invention is the two layer coating with a softer inner layer with round/hard carbides bonded to the substrate and a second harder outer layer with larger more angular friable carbides deposited on top of the softer layer. This combination of layers provides both better wear resistance from small angular sand particles as well as better impact resistance from larger, heavier particles. The softer layer effectively acts to help absorb the shock of the impact from large lumps of oil sand. The top layer provides the abrasion resistance due to the combination of the characteristics of the carbides and the metal matrix that surrounds the carbides.

It will be understood that other embodiments and examples of the invention will be readily apparent to a person skilled in the art, the scope and purview of the invention being defined in the appended claims.

The invention claimed is:
1. A method of hard facing a metal substrate with an abrasion and impact resistant coating comprising:
fusing a mixture of about 35 to 45 wt % of a nickel-, cobalt- or iron-base matrix alloy and about 55 to 65 wt % of dispersed carbide particles onto the substrate for metallurgically bonding of a first coat having a first hardness onto the substrate, and fusing a second mixture of about 35 to 45 wt % of a nickel-, cobalt- or iron-based matrix alloy and about 55 to 65 wt % of carbide particles onto the first coat for metallugically bonding of a second coat having a matrix hardness greater than the matrix hardness of the first coat onto the first coat.

2. A method as claimed in claim 1, in which the carbide particles of the first coat are non-angular tungsten carbide particle having a size in the range of about 60 to 250μ and the carbide particle in the second coat are angular tungsten carbide particles having a size in the range of about 60 to 250μ.

3. A method as claimed in claim 2, in which the first coat has a matrix hardness of about 30-40 Rc and the second coat has a matrix hardness of about 50-60 Rc.

4. A method as claimed in claim 3, in which the first coat is fused onto the substrate at a temperature in the range of 250-350° C. and the second coat is fused onto the first coat at a temperature in the range of 300-375° C. by plasma transferred arc welding.

5. A method as claimed in claim 4, in which the first coat comprises about 37 to 43 wt % nickel-based matrix alloy containing about 3.8 wt % C, 1.2 wt % B, 4.0 wt % Si, 6.7 wt % Cr, 2.1 wt % Fe, the balance Ni, and about 63 to 57 wt % non-angular tungsten carbide particles deposited on the substrate by plasma transferred arc welding, and the second coat comprises about 37 to 43 wt % nickel-based matrix alloy containing about 2.3 wt % C, 3 wt % B, 3 wt % Si, 0.5 wt % Fe, the balance Ni, and about 63 to 57 wt % angular tungsten carbide particles deposited on the first coat by plasma transferred arc welding.

6. A method as claimed in claim 5, in which the first coat is deposited in a thickness in the range of 2.5 to 3.5 μm on the substrate by plasma transferred arc welding at a temperature of about 290° C. and the second coat is deposited onto the first coat in a thickness of about 2.5 to 3.5 mm by plasma transferred arc welding at a temperature of about 315° C.

7. A method as claimed in claim 4, in which the second coat is applied by plasma transferred arc welding to the first coat at an orientation not the same as orientation of the first coat.

8. A method as claimed in claim 7, in which the orientation of the second coat is at an angle of from about 45° to 90° of the orientation of the first coat.

* * * * *